US011651221B2

United States Patent
Cui et al.

(10) Patent No.: US 11,651,221 B2
(45) Date of Patent: May 16, 2023

(54) METHOD, DEVICE, AND COMPUTER PROGRAM PRODUCT FOR DEEP LEARNING

(71) Applicant: EMC IP Holding Company LLC, Hopkinton, MA (US)

(72) Inventors: Wei Cui, Beijing (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 972 days.

(21) Appl. No.: 16/428,417

(22) Filed: May 31, 2019

(65) Prior Publication Data

US 2020/0134508 A1 Apr. 30, 2020

(30) Foreign Application Priority Data

Oct. 31, 2018 (CN) .......................... 201811286353.7

(51) Int. Cl.
*G06N 20/20* (2019.01)
*G06K 9/62* (2022.01)
*G06N 5/043* (2023.01)

(52) U.S. Cl.
CPC .......... *G06N 20/20* (2019.01); *G06K 9/6256* (2013.01); *G06N 5/043* (2013.01)

(58) Field of Classification Search
CPC .......... G06N 20/20; G06N 5/043; G06N 3/08; G06N 3/0454; G06K 9/6256
USPC .......................................................... 706/12
See application file for complete search history.

(56) References Cited

U.S. PATENT DOCUMENTS

| 9,412,065 | B1 * | 8/2016 | Corrado | G06N 7/08 |
| 2014/0297591 | A1 | 10/2014 | Chiang et al. | |
| 2015/0324690 | A1 * | 11/2015 | Chilimbi | G06N 3/063 |
| | | | | 706/27 |
| 2016/0110657 | A1 * | 4/2016 | Gibiansky | G06N 20/00 |
| | | | | 706/12 |
| 2017/0140020 | A1 | 5/2017 | Greenlee et al. | |
| 2018/0089587 | A1 | 3/2018 | Suresh et al. | |

(Continued)

FOREIGN PATENT DOCUMENTS

EP 3188086 A1 7/2017

OTHER PUBLICATIONS

Zhang, "Poseidon: A System Architecture for Efficient GPU-based Deep Learning on Multiple Machines", arXiv Dec. 19, 2015 (Year: 2015).*

(Continued)

*Primary Examiner* — Juan A Torres
(74) *Attorney, Agent, or Firm* — Ryan, Mason & Lewis, LLP

(57) ABSTRACT

A method, device and computer program product for deep learning are provided. According to one example, a parameter related to a deep learning model for a training dataset allocated to a server is obtained at a client; a transmission state of the parameter is determined, the transmission state indicating whether the parameter has been transmitted to the server; and information associated with the parameter to be sent to the server is determined based on the transmission state to update the deep learning model. Therefore, the performance of deep learning may be improved, and the network load of deep leaning may be reduced.

20 Claims, 12 Drawing Sheets

(56) References Cited

U.S. PATENT DOCUMENTS

2019/0340534 A1\* 11/2019 McMahan ............... G06F 17/18
2020/0050936 A1\* 2/2020 Edelsten .................. G06N 3/08

OTHER PUBLICATIONS

Mcmahan, "Federated Learning of deep networks using model averaging" arXiv: 1602.05629, Feb. 28, 2017 (Year: 2017).\*

\* cited by examiner

METHOD, DEVICE, AND COMPUTER PROGRAM PRODUCT FOR DEEP LEARNING

RELATED APPLICATION(S)

The present application claims priority to Chinese Patent Application No. 201811286353.7, filed Oct. 31, 2018, and entitled "Method, Device, and Computer Program Product for Deep Learning," which is incorporated by reference herein in its entirety.

FIELD

Various embodiments of the present disclosure relate to deep learning, and more specifically, to a method, device and computer program product for managing a parameter of a deep learning model.

BACKGROUND

Applications such as deep learning drive huge demands on accelerators/dedicated processing resources such as graphics processing units (GPUs) or field programmable gate arrays (FPGAs). For example, currently there are the following problems: the data size, velocity and variety growth; scalable computing fails to meet the demand, while the use of dedicated processing resources gets increasingly popular; data transmission is equally important to computation; there is a need to optimize the use of expensive dedicated processing resources introduced to the data center; and there is a need to connect to the cloud. Therefore, optimizing the use of dedicated processing resources is of critical importance to users in fields such as healthcare, manufacturing, Internet of Things, finance, oil, sales and consulting.

SUMMARY

Embodiments of the present disclosure provide a method, device and computer program product for deep learning.

In a first aspect of the present disclosure, a method is provided for deep learning. The method comprises: obtaining, at a client, a parameter related to a deep learning model for a training dataset allocated to a server; determining a transmission state of the parameter, the transmission state indicating whether the parameter has been transmitted to the server; and determining, based on the transmission state, information associated with the parameter to be sent to the server to update the deep learning model.

In a second aspect of the present disclosure, a method is provided for deep learning. The method comprises: receiving, at a server, information associated with a first parameter from a client, the first parameter being related to a deep learning model for a training dataset allocated to the server; determining the first parameter based on the information; and updating the deep learning model using the first parameter.

In a third aspect of the present disclosure, a device is provided for deep learning. The device comprises at least one processing unit and at least one memory. The at least one memory is coupled to the at least one processing unit and stores instructions executed by the at least one processing unit. The instructions, when executed by the at least one processing unit, causes the device to perform acts including: obtaining, at a client, a parameter related to a deep learning model for a training dataset allocated to a server; determining a transmission state of the parameter, the transmission state indicating whether the parameter has been transmitted to the server; and determining, based on the transmission state, information associated with the parameter to be sent to the server to update the deep leaning model.

In a fourth aspect of the present disclosure, a device is provided for deep learning. The device comprises at least one processing unit and at least one memory. The at least one memory is coupled to the at least one processing unit and stores instructions executed by the at least one processing unit. The instructions, when executed by the at least one processing unit, causes the device to perform acts including: receiving, at a server, information associated with a first parameter from a client, the first parameter being related to a deep learning model for a training dataset allocated to the server; determining the first parameter based on the information; and updating the deep learning model using the first parameter According to a fifth aspect of the present disclosure, there is provided a computer program product. The computer program product is tangibly stored on a computer readable medium and comprises machine executable instructions which, when executed, cause the machine to implement a method according to the first aspect.

According to a sixth aspect of the present disclosure, there is provided a computer program product. The computer program product is tangibly stored on a computer readable medium and comprises machine executable instructions which, when executed, cause the machine to implement a method according to the second aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference numeral usually refers to the same component in the example embodiments of the present disclosure.

Throughout the figures, the same or corresponding numeral refers to the same or corresponding part.

DETAILED DESCRIPTION

Preferred embodiments of the present disclosure will be described in more details with reference to the drawings. Although the drawings illustrate preferred embodiments of the present disclosure, it should be appreciated that the present disclosure can be implemented in various manners and should not be limited to the embodiments explained herein. On the contrary, the embodiments are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and so on can refer to same or different objects. The following text also can comprise other explicit and implicit definitions.

Figure 1:
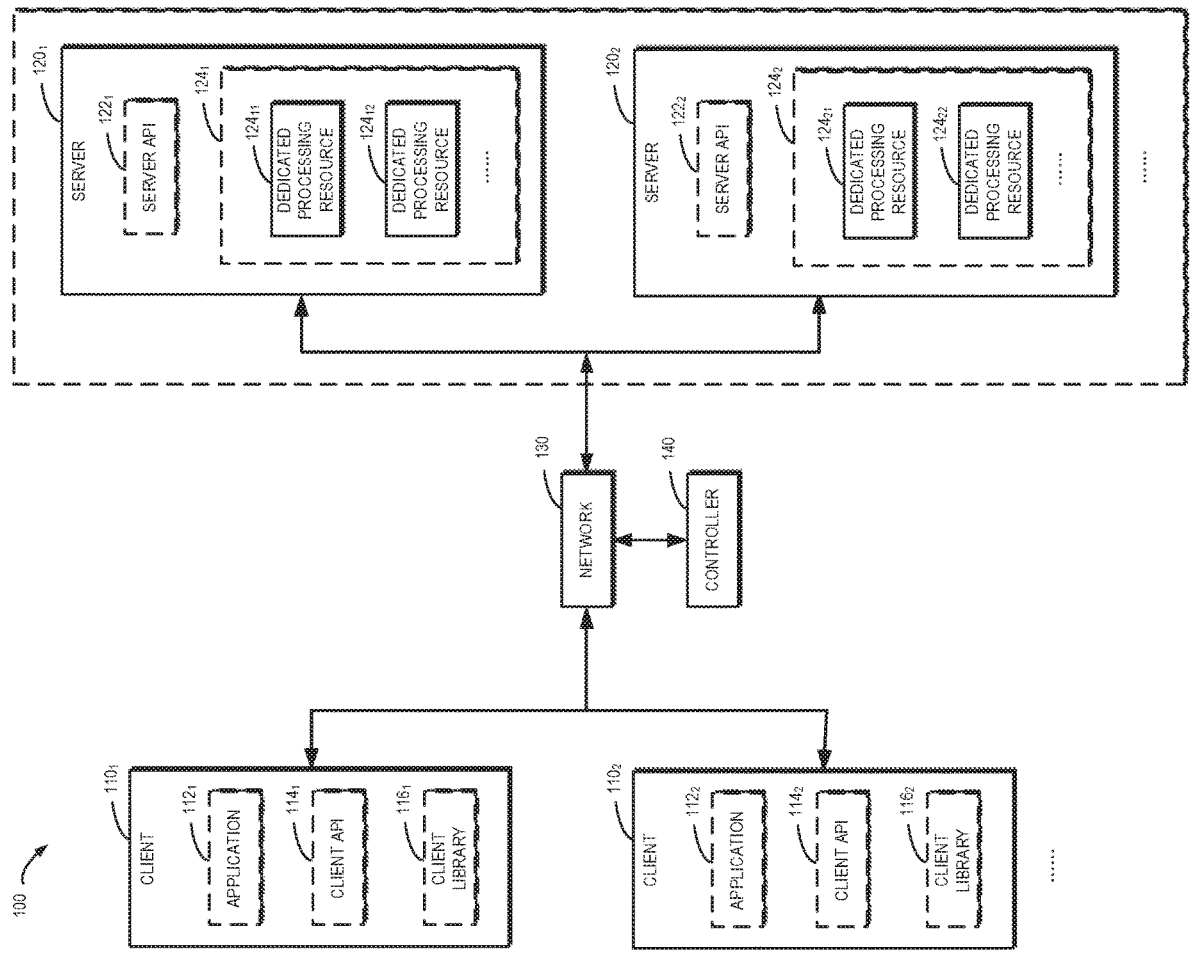
FIG. 1 shows a schematic view of an example environment in which embodiments of the present disclosure can be implemented.

FIG. 1 shows a schematic view of an example environment 100 in which embodiments of the present disclosure can be implemented. The example environment 100 may be an environment for managing dedicated processing resources, e.g., a GPU-as-a-Service environment. As depicted, the example environment 100 may comprise a client $110_1$ and a client $110_2$ (collectively referred to as "client 110" herein), a server $120_1$ and a server $120_2$ (collectively referred to as "server 120" herein), a network 130 and a controller 140.

In some embodiments, the client $110_1$ and the client $110_2$ may comprise an application $112_1$ and an application $112_2$ (collectively referred to as "application 112"), a client application programming interface (API) $114_1$ and a client API $114_2$ (collectively referred to as "client API 114" herein), and a client library $116_1$ and a client library $116_2$ (collectively referred to as "client library 116" herein) respectively. Note although FIG. 1 merely illustrates two clients (i.e., the client $110_1$ and the client $110_2$), the example environment 100 may comprise any number of clients.

In some embodiments, the server $120_1$ and the server $120_2$ may comprise a server API $122_1$ and a server API $122_2$ (collectively referred to as "server API 122"), as well as a dedicated processing resource $124_1$ and a dedicated processing resource $124_2$ (collectively referred to as "dedicated processing resource 124" herein) respectively. Note although FIG. 1 merely illustrates two servers (i.e., the server $120_1$ and the server $120_2$), the example environment 100 may comprise any number of servers.

In addition, the dedicated processing resource $124_1$ and the dedicated processing resource $124_2$ may comprise a dedicated processing resource $124_{11}$ and a dedicated processing resource $124_{12}$, as well as a dedicated processing resource $124_{21}$ and a dedicated processing resource $124_{22}$ respectively. Note although FIG. 1 shows the dedicated processing resource 124 merely comprises two dedicated processing resources, the dedicated processing resource 124 may comprise any number of dedicated processing resources.

The network 130 may be a network using the Transmission Control Protocol (TCP) or Remote Direct Data Access (RDMA). Examples of the network 130 are not limited thereto, but may be any wired or wireless network supporting data communication. In addition, the controller 140 may manage the dedicated processing resource 124 on the server 120, e.g., allocate the dedicated processing resource 124 to the application 112.

In some embodiments, the application 112 (e.g., an application related to deep learning) may request the dedicated processing resource 124 by function calls. The client library 116 may intercept the function calls of the application 112 by providing the same client API 114 as the server API 122. After intercepting a function call, the client library 116 may send the function call to the server 120 via the network 130. According to the scheduling of the controller 140, the server 120 performs computation for the function call by means of the dedicated processing resource 124 allocated to the application 112 and returns the computation result to the client library 116. Then, the client library 116 may receive the computation result from the server 120. Since the process is transparent to the application 112, it appears to the application 112 that virtual dedicated processing resources exist on the client 110.

For example, such example environment 100 has the following features:

Remote dedicated processing resource access
Consume remote dedicated processing resources transparently;
Based on a queue model and various network fabrics.
Dedicated processing resource sharing
N:1 model, i.e., multiple applications consume the same dedicated processing resource;
Fine-grained control and management.
Dedicated processing resource chaining
1:N model, i.e., multiple dedicated processing resources are chained as a whole to serve one application;
A number of dynamic dedicated processing resource suitable for an application.
Smart scheduling
Dedicated processing resource pooling, discovery and provision;
Fine-grained dedicated processing resource monitoring and tracing;
Scalable intelligent scheduling algorithms: heterogeneous dedicated processing resources and network tradeoffs.

In such example environment 100, deep learning (DL) models may be trained. Today deep learning models have become increasingly large, for example, ResNet model develops from 50 layers to 200 layers, and Inception model develops from handling 32×32 image size, to 224×224 image size, until 512×512 image size. Obviously, deep learning models require more and more resources and workloads. As a result, it is difficult to manage and unite dedicated processing resources to train modern and huge deep learning models.

To this end, dedicated processing resources on multiple physical servers may be aggregated to serve a single application. This enables to build a single global dedicated processing resource pool across multiple physical servers to significantly simplify the management of distributed dedicated processing resources and also improve the resource utilization of dedicated processing resources.

However, in various applications relying on dedicated processing resources like the deep learning model training, since the deep learning model training is compute-intensive, the deep learning model is often trained on multiple dedicated processing resources to speed up computation, which is also called distributed deep learning model training.

On a traditional server with multiple same dedicated processing resources, the model training is usually done by partitioning the jobs (i.e., the training dataset) evenly to each dedicated processing resource, and different job partitions will frequently exchange parameters with each other for synchronization.

In the example environment 100, a deep learning model may be trained using many virtual dedicated processing resources provided from one or more remote server 120. However, unlike training the deep learning model using multiple local physical dedicated processing resources, virtual dedicated processing resources will consume network bandwidth for exchanging parameters, which will slow down the performance of distributed virtual dedicated processing resources.

When training deep learning models using multiple dedicated processing resources, a parameter server may be used for exchanging parameters between dedicated processing resources. Parameters may be stored on either the central processing unit (CPU) (so-called parameter server on CPU) or GPU (so-called parameter server on GPU). The parameter server on CPU is more commonly supported and used by all frameworks, while the parameter server on GPU requires a bus such as Nvlink and its communication protocol to ensure the GPU peers can exchange parameters efficiently.

Figure 2:
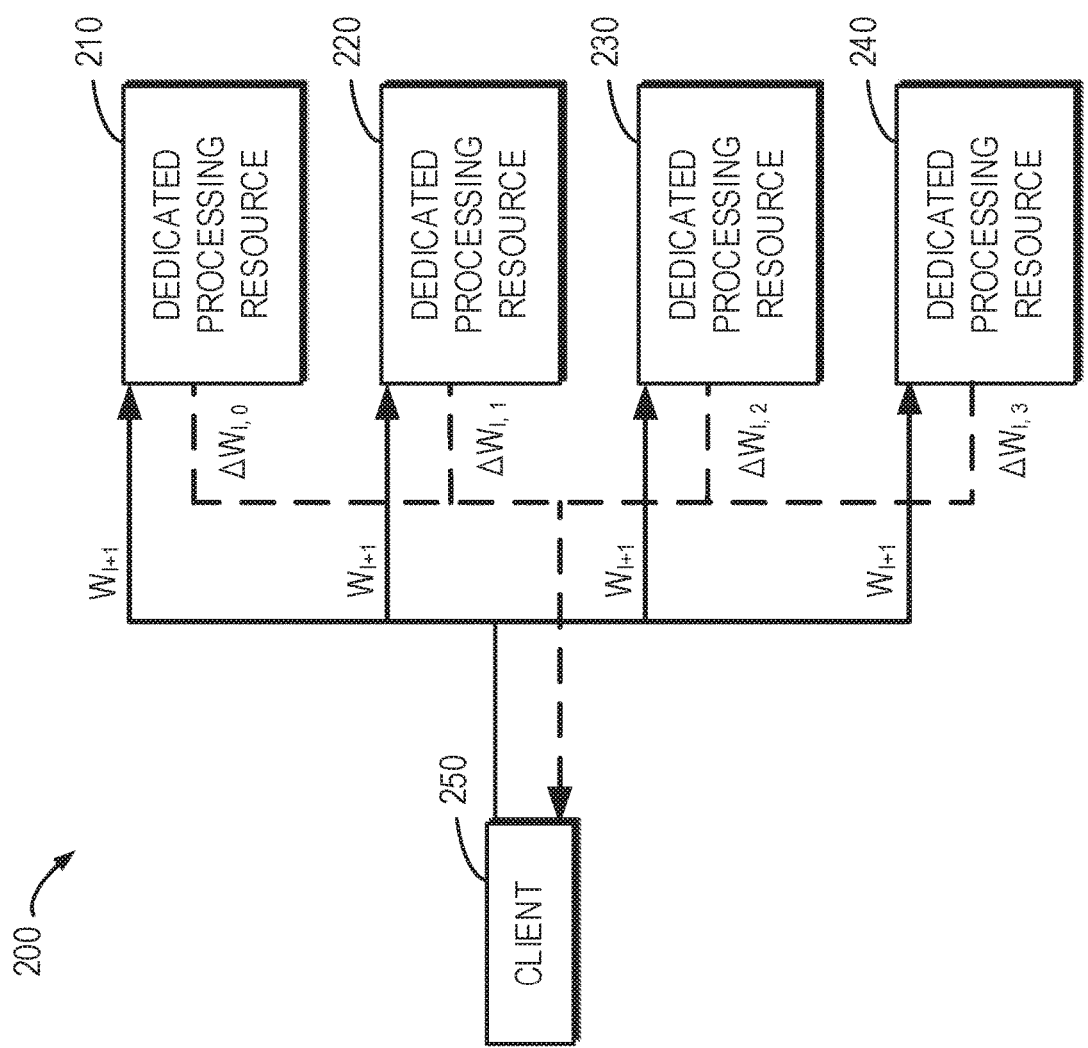
FIG. 2 shows a schematic view of exchanging parameters of a deep learning model according to some embodiments of the present disclosure.

FIG. 2 shows a schematic view 200 of exchanging parameters of the deep learning model according to some embodiments of the present disclosure. As depicted, take the parameter server on CPU at a client 250 for example. According to the common process of distributed deep learning model training, a data path for the parameter server on CPU may be summarized as the iteration of three steps below:

(1) Each dedicated processing resource sends its latest computed local parameters to the parameter server on CPU stored at the client 250, e.g. changes of weights of the deep learning model ($\Delta W_{I,0} \ldots \Delta W_{I,N-1}$, wherein I denotes the time of iterations, and N denotes the number of a dedicated processing resource). As shown in FIG. 2, dedicated processing resources 210-240 send weights $\Delta W_{I,0}$-$\Delta W_{I,3}$ to the parameter server on CPU stored at the client 250 respectively.

(2) The parameter server on CPU stored at the client 250 receives local parameters and calculates integral parameters based thereon. For example, the parameter server may calculate integral parameters based on an equation below:

$$W_{I+1} = W_I - \lambda \cdot \Sigma_N \Delta W_{I,N} \quad (1)$$

Wherein I denotes the time of iterations, and N denotes the number of a dedicated processing resource. Usually, changes of weights $\Delta W_{I,0} \ldots \Delta W_{I,N-1}$ are different, while the integral weight $W_{I+1}$ is always the same.

(3) The parameter server on CPU stored at the client 250 sends the integral weight $W_{I+1}$ back to each of the dedicated processing resources 210-240.

Figure 3:
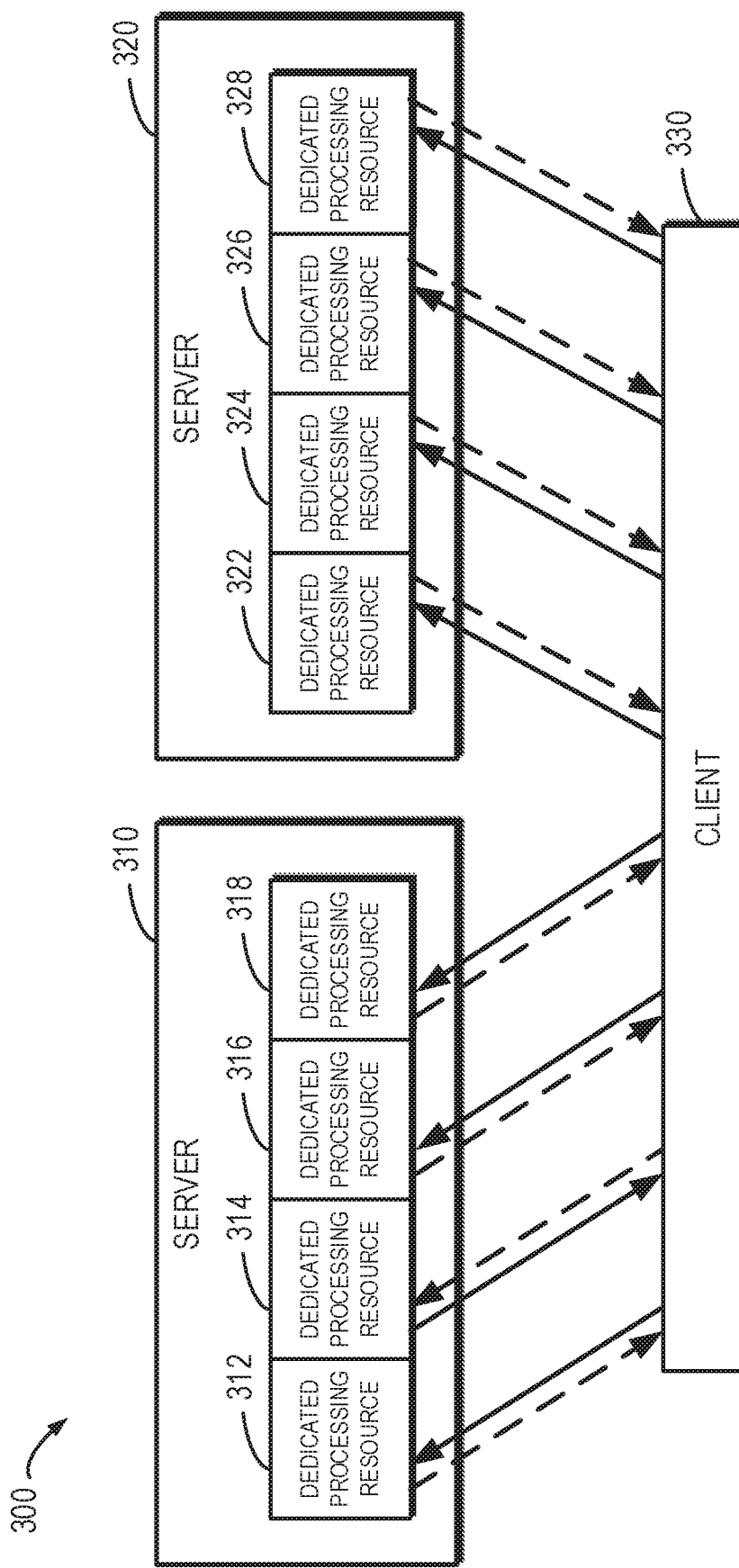
FIG. 3 shows a schematic view of the traditional transmission of parameters of a deep learning model.

It can be seen that, receiving and sending parameters between clients and remote dedicated processing resources will introduce network overheads. FIG. 3 shows a schematic view 300 of traditional transmission of parameters of a deep learning model. As depicted, suppose there are two servers 310 and 320, each of which has four dedicated processing resources 312-318 and 322-328 respectively. In this case, in one iteration, the deep learning model training will exchange 16 parameters between a client 330 and the dedicated processing resources 312-318 and 322-328 (as shown by solid arrows and dashed arrows). Since a single parameter occupies large space (e.g. 90 MB), parameter exchanging will consume huge network bandwidth.

Figure 4:
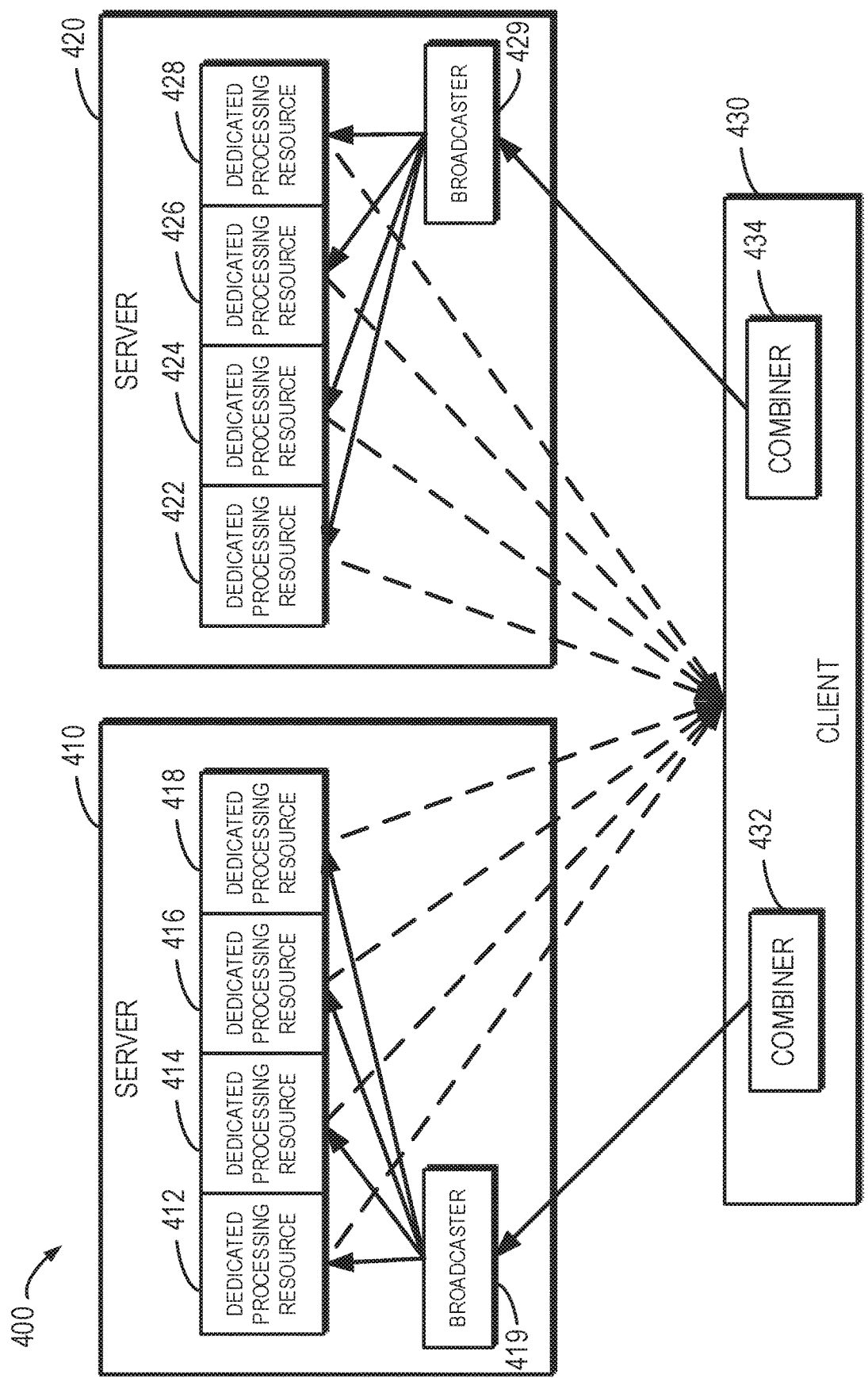
FIG. 4 shows a schematic view of the transmission of parameters of a deep learning model according to some embodiments of the present disclosure.

To solve the above problems, since the integral weight remains the same, the parameter exchanging process may be optimized (specifically, the transmission of the integral weight $W_{I+1}$ may be optimized) to reduce network overheads and thus improving the deep learning performance. The process of optimizing parameter exchanging will be described in reference with FIGS. 4-6. FIG. 4 shows a schematic view 400 of transmitting parameters of a deep learning model according to some embodiments of the present disclosure. As depicted, a client 430 may comprise combiners 432 and 434. The combiner 432 may correspond to a server 410 and combine parameters to be sent to the server 410. Similarly, the combiner 434 may correspond to a server 420 and combine parameters to be sent to the server 420.

Accordingly, the server 410 may comprise a broadcaster 419. The broadcaster 419 may receive parameters from the combiner 432 and send the received parameters to dedicated processing resources 412-418. Similarly, the server 420 may comprise a broadcaster 429. The broadcaster 429 may receive parameters from the combiner 434 and send the received parameters to dedicated processing resources 422-428.

Note although FIG. 4 merely illustrates two servers and two corresponding broadcasters as well as two corresponding combiners, the example environment 100 may comprise any number of servers and their corresponding broadcasters and combiners. In addition, although FIG. 4 shows two combiners 432 and 434 corresponding to the servers 410 and 420 respectively, the combiners 432 and 434 may be implemented as a single combiner, so that the single combiner performs combination and sending of parameters to be transmitted to the servers.

Compared with the implementation of exchanging 16 parameters as shown in FIG. 3, the implementation shown in FIG. 4 significantly reduces network overheads because the transmission of integral weights $W_{I+1}$ are merged.

Further, to guarantee the correctness and consistency of combinations of parameters, on the one hand, the combiners 432 and 434 may maintain a server identifier, a parameter-related identifier and a digest. Specifically, in some embodiments, the server identifier may be used to identify a server. Each server has its unique server identifier. For example, the server identifier may indicate the namespace of a server to differentiate its local list items from items from other servers.

The parameter-related identifier may identify an address of a parameter in a memory. In some embodiments, the parameter-related identifier may comprise an offset and a size, wherein the offset indicates a preamble address of the parameter in the memory of the client 430, and the size refers to the size of the memory in bytes which is occupied by the parameter. Apparently, a position of the parameter in the memory starts from the preamble address indicated by the offset and ends at an end address determined by adding the preamble address and the size of the memory. In addition, the digest may be used to identify and encrypt content of the parameter. The client 430 may generate a digest of the parameter by a digest generating algorithm such as MD5 algorithm and SHA-1 algorithm.

On the other hand, the broadcasters 419 and 429 may maintain a parameter-related identifier and the parameter itself. In some embodiments, the parameter-related identifier maintained by the broadcasters 419 and 429 is the same as the parameter-related identifier maintained by the combiners 432 and 434. In addition, the broadcasters 419 and 429 may further maintain the parameter itself, so that they can provide the parameter to the dedicated processing resources 412-418 and 422-428 when the parameter does not change.

Figure 5:
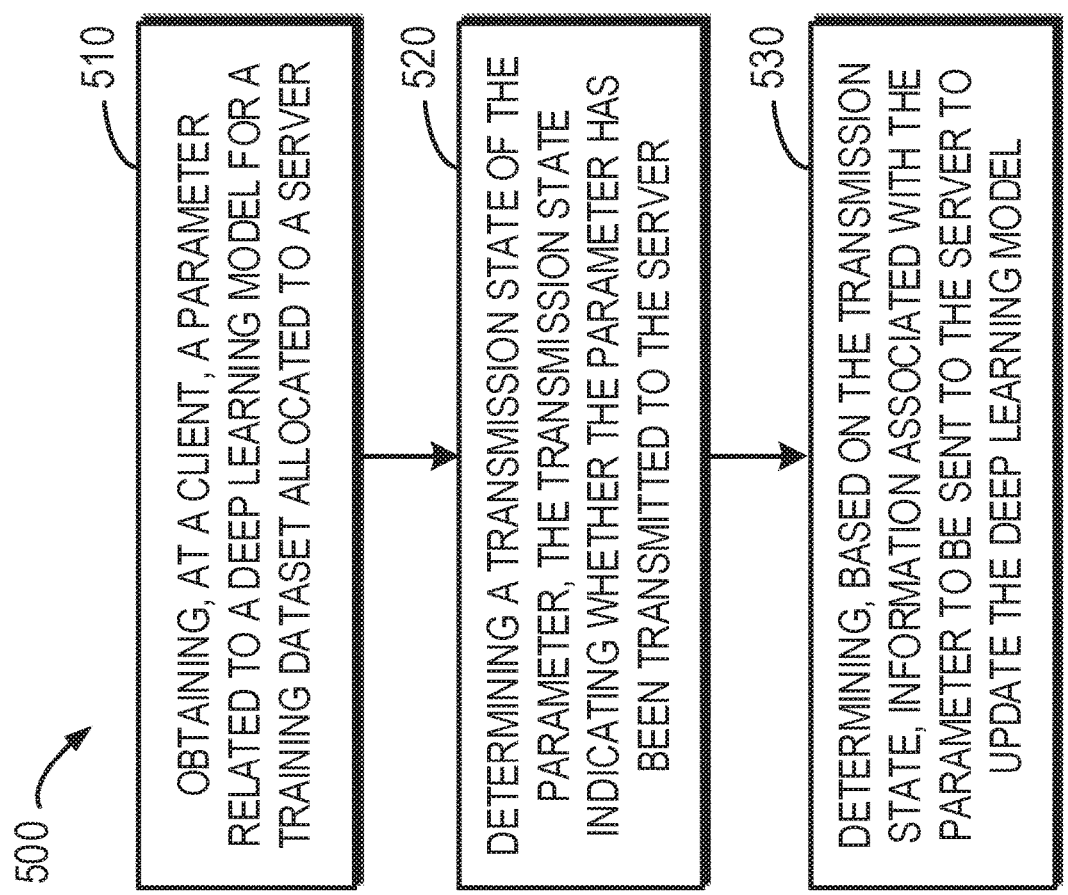
FIG. 5 shows a flowchart of an example of a method for transmitting, at a client, parameters of a deep learning model according to some embodiments of the present disclosure.

FIG. 5 shows a flowchart 500 of an example of a method for transmitting a parameter of a deep learning model at the client 430 according to some embodiments of the present disclosure. For example, the method 500 may be performed at the client 430 as shown in FIG. 4 or other appropriate device. In addition, the method 500 may further comprise an additional step which is not shown and/or omit a step which is shown, and the scope of the present disclosure is not limited in this regard.

At 510, a parameter associated with a deep learning model for a training dataset allocated to a server is obtained at the client 430. In some embodiments, a weight associated with the deep learning model for the training dataset may be obtained at the client 430, the weight being determined based on a weight change from the server (e.g. server 410). For example, the weight may be integral weight $W_{I+1}$, and the weight changes may be $\Delta W_{I,0} \ldots \Delta W_{I,N-1}$. In addition, in some embodiments, the server to which the parameter is directed may be determined based on a server identifier.

At 520, the client 430 determines a transmission state of the parameter, the transmission state indicating whether the parameter has been transmitted to the server (e.g., server 410). In some embodiments, the client 430 may generate a digest for identifying the parameter (referred to as "first digest" herein). As described above, the client 430 may generate the first digest via a digest generating algorithm such as MD5 algorithm and SHA-1 algorithm. Then, the client 430 may obtain a previously determined digest associated with the parameter (referred to as "second digest" herein). As described, the second digest may be a digest maintained by the client 430.

The client 430 may compare the first digest with the second digest. When the first digest matches the second digest, the client 430 may determine that the transmission state indicates the parameter has been transmitted. On the contrary, when the first digest does not match the second digest, the client 430 may determine that the transmission state indicates the parameter has not been transmitted.

At 530, the client 430 determines, based on the transmission state, information which is associated with the parameter and to be sent to the server to update the deep learning model. When the transmission state indicates the parameter has been transmitted, the client 430 may send, to the server 410, an identifier associated with the parameter and the transmission state. For example, the client 430 may send, to the server (e.g., server 410), an offset and size associated with the parameter and a flag bit indicating the transmission state. On the contrary, when the transmission state indicates the parameter has not been transmitted, the client 430 may send, to the server, the identifier, the transmission state and the parameter. For example, the client 430 may send, to the server (e.g., server 410), an offset and size associated with the parameter, a flag bit indicating the transmission state, and the parameter itself.

In this way, before the client 430 sends the parameter to the server (e.g. server 410), the client 430 may compare a current digest of the parameter with a previous digest to check whether the parameter has been previously sent to the server and does not change. If the parameter has changed, then the client 430 sends the parameter, the identifier associated with the parameter, and the transmission state to the server 410. If the parameter does not change, then the client 430 only sends the identifier associated with the parameter and the transmission state so as to notify the server 410 to reuse the parameter identified by the identifier. Therefore, network traffic for transmitting the parameter may be saved, and the efficiency and performance of deep learning may be improved.

In addition, the client 430 may delete the second digest and store the first digest. Therefore, when the parameter has changed, the client 430 may replace the previous digest with the current digest so that the digest maintained by the client 430 keeps updated.

Figure 6:
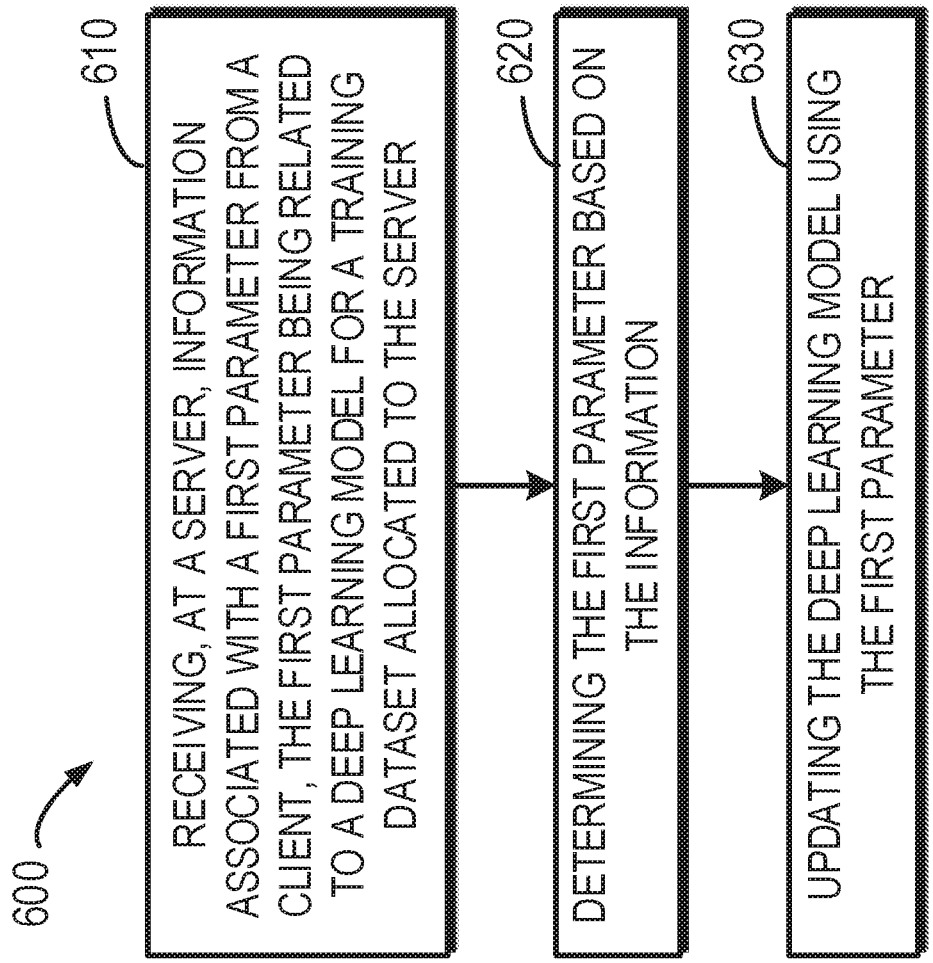
FIG. 6 shows a flowchart of an example of a method for transmitting, at a server, parameters of a deep learning model according to some embodiments of the present disclosure.

While acts performed at the client 430 have been described in reference with FIG. 5, acts performed at the server 410 or 420 will be described in reference with FIG. 6. This figure shows a flowchart 600 of an example of a method for transmitting a parameter of a deep learning model at a server according to some embodiments of the present disclosure. Although the method 600 is to be described as being performed at the server 410 below, the method 600 may be performed at the server 420 as shown in FIG. 4 or other appropriate device. In addition, the method 600 may further comprise an additional step which is not shown and/or omit a step which is shown, and the scope of the present disclosure is not limited in this regard.

At 610, information associated with a parameter (referred to as "first parameter" herein) is received at the server 410 from the client 430. The first parameter is related to a deep learning model for a training dataset allocated to the server 410. At 620, the first parameter is determined based on the information.

In some embodiments, the server 410 may obtain an identifier associated with the first parameter from the information, when the server 410 determines that the first parameter has been transmitted based on the information. In addition, the server 410 may further obtain, as the first parameter, a parameter (referred to as "second parameter" herein) being previously stored and related to the first parameter based on the identifier. For example, when the received information comprises an offset, a size and a flag bit of a transmission state, and the flag bit of the transmission state indicates the first parameter has been transmitted, the server 410 may determine that the first parameter has been transmitted based on the flag bit of the transmission state, and obtain the offset and the size. Then, the server 410 may obtain the second parameter by using the offset and the size as keywords and then use the obtained second parameter as the first parameter.

In addition, the server 410 may obtain, from the information, an identifier associated with the first parameter together with the first parameter, when the server 410 determines that the first parameter has not been transmitted based on the information. For example, when the received information comprises an offset, a size, a flag bit of a transmission state and a first parameter, and the flag bit of the transmission state indicates the first parameter has not been transmitted, the server 410 may determine that the first parameter has not been transmitted based on the flag bit of the transmission state, and obtain the offset, the size and the first parameter. Further, when the first parameter has not been transmitted, the server 410 may delete the previously stored second parameter by using the offset and the size as keywords and then store the first parameter in the server. Alternatively, when the first parameter has not been transmitted and there is no previously stored second parameter, the server 410 may store the first parameter in the server 410 by using the offset and the size as keywords.

At 630, the server updates the deep learning model using the first parameter. For example, as described above, the first parameter may be integral weight $W_{I+1}$ of the deep learning model. The server 410 may provide the first parameter to the dedicated processing resources 412-418 so that the dedicated processing resources 412-418 continue to iterate the deep leaning model based on the updated integral weight $W_{I+1}$, until the deep learning model converges.

In this way, the server 410 stores and updates the parameter related to the deep learning model simply and efficiently and provides it to dedicated processing resources for further computation.

Figure 7:
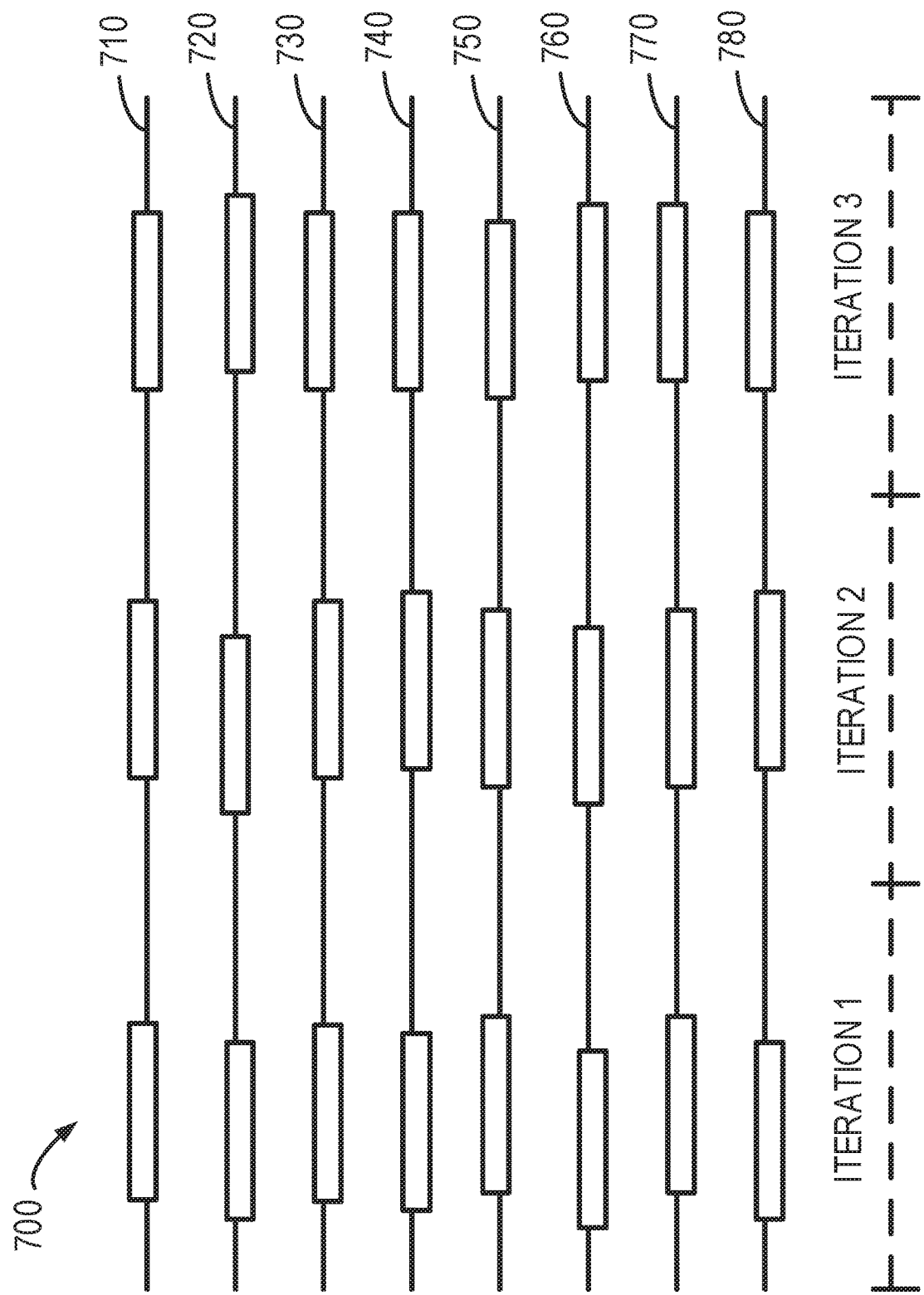
FIG. 7 shows a schematic view of network traffic of the traditional transmission of parameters of a deep learning model in ideal circumstances.
Figure 8:
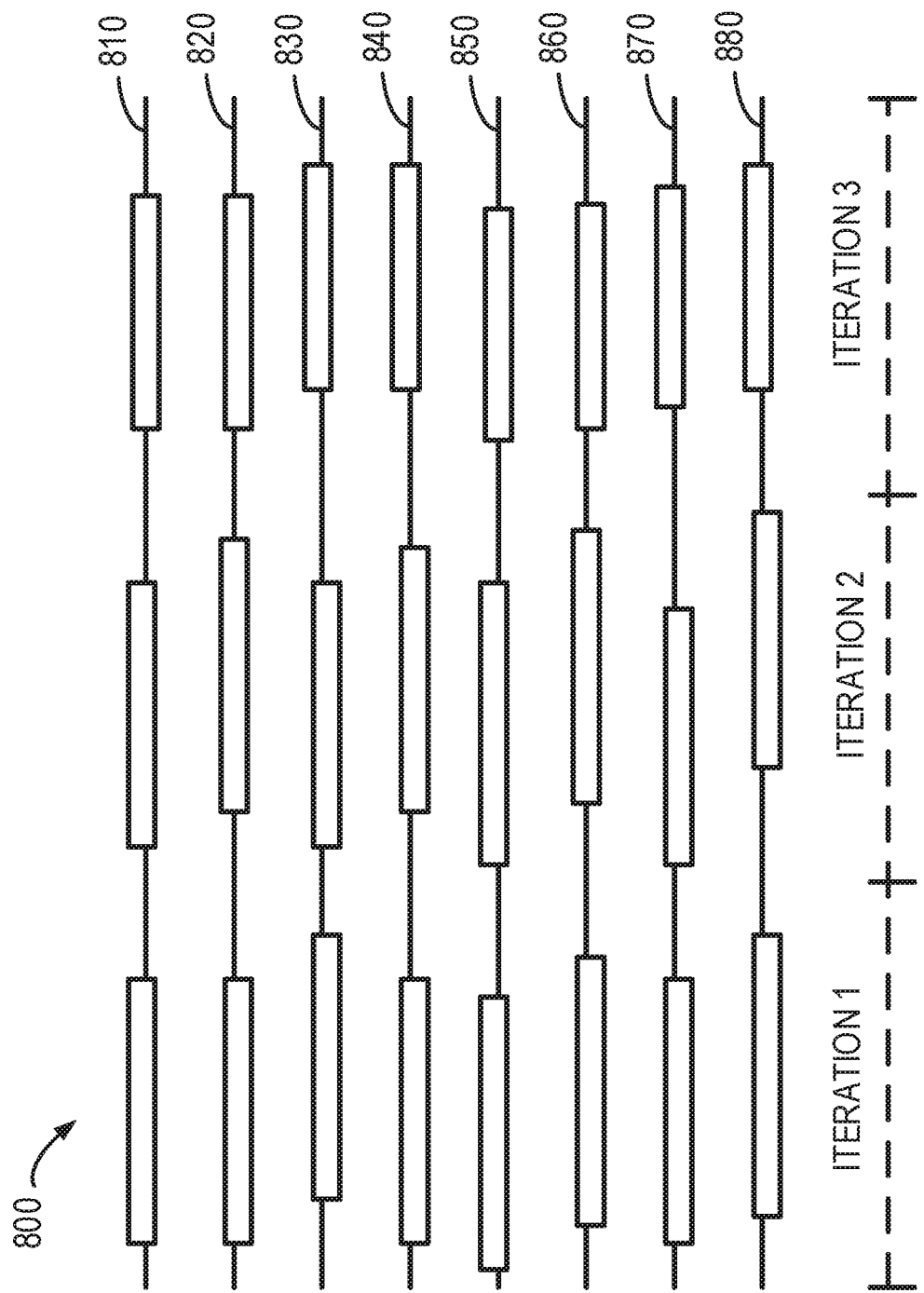
FIG. 8 shows a schematic view of network traffic of the traditional transmission of parameters of a deep learning model in real circumstances.
Figure 9:
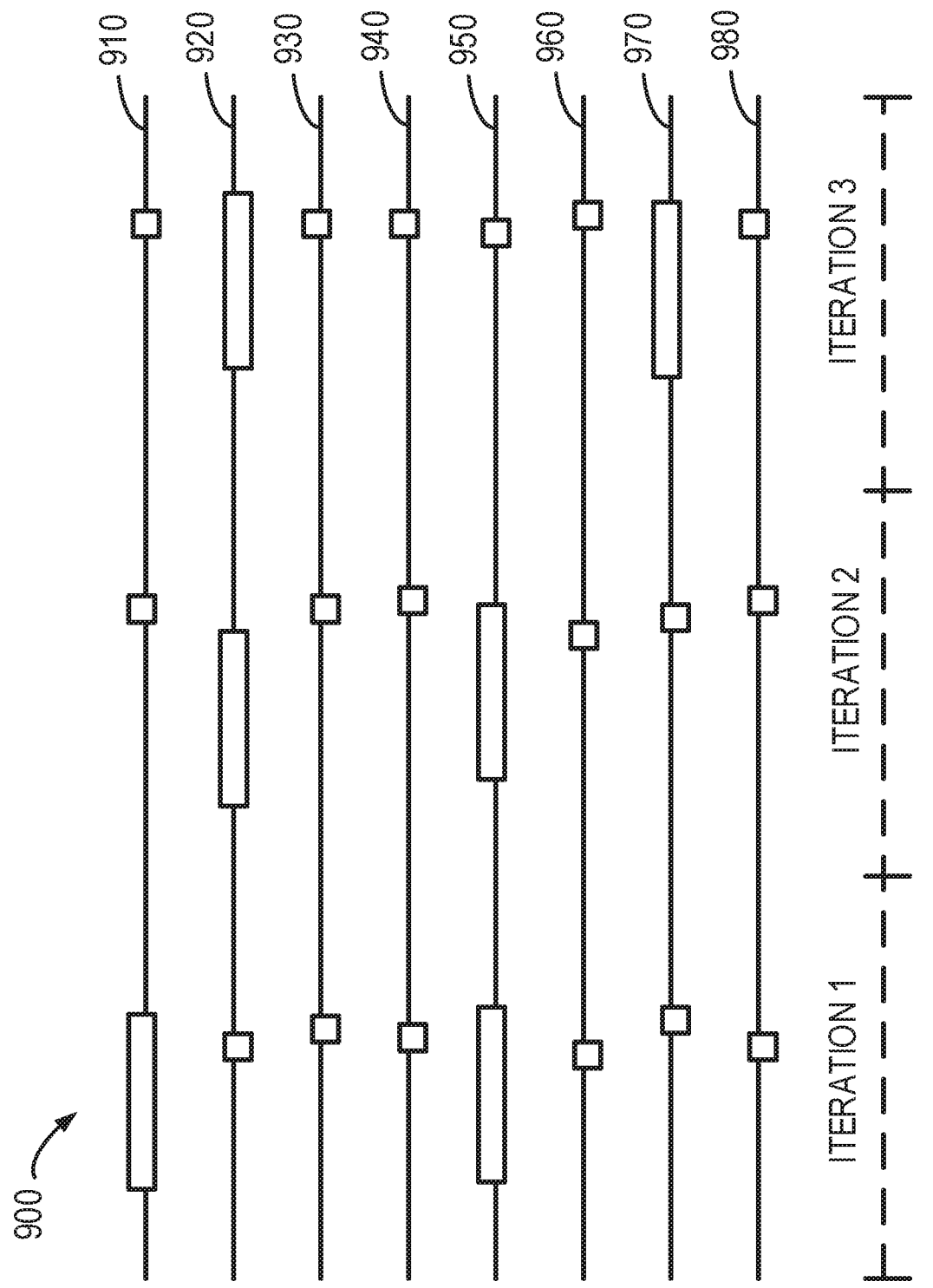
FIG. 9 shows a schematic view of network traffic of the transmission of parameters of a deep learning model according to some embodiments of the present disclosure.

FIGS. 7-9 each make a comparison between network traffic for traditional transmission of a parameter of a deep learning model and network traffic for transmission of a parameter of a deep learning model according to some embodiments of the present disclosure. FIG. 7 shows a schematic view 700 of network traffic for traditionally transmitting a parameter of a deep learning model in ideal circumstances. Graphics 710-780 represent network overheads of the dedicated processing resources 412-418 and 422-428 respectively. In ideal circumstances, since the network bandwidth is infinite, the traditional method will consume large network traffic without damaging performance.

FIG. 8 shows a schematic view 800 of network traffic for traditionally transmitting a parameter of a deep learning model in real circumstances. Like FIG. 7, graphics 810-880 represent network overheads of the dedicated processing resources 412-418 and 422-428 respectively. However, in real circumstances, since the network bandwidth is finite, the traditional method will lead to network conflicts.

FIG. 9 shows a schematic view 900 of network traffic for transmitting a parameter of a deep learning model according to some embodiments of the present disclosure. Like FIG. 7, graphics 910-980 represent network overheads of the dedicated processing resources 412-418 and 422-428 respectively. As shown in FIG. 9, after the parameter transmission is optimized, network traffic consumed by the parameter transmission reduces significantly. In addition, under a low-bandwidth network, the optimized parameter transmission will significantly improve the iteration performance while reducing network usage.

Figure 10:
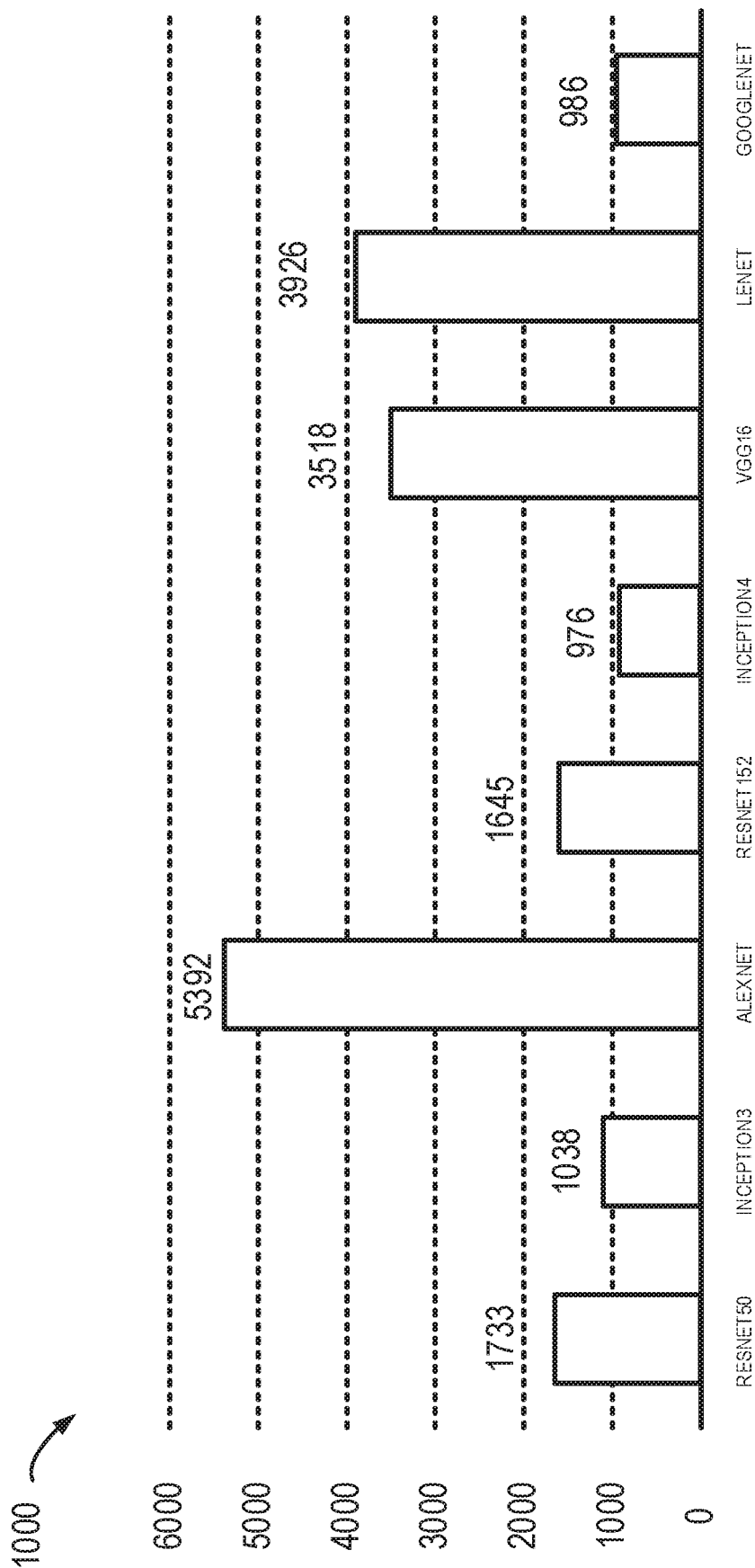
FIG. 10 shows a schematic view of network traffic of the parameter transmission with respect to various deep learning models.
Figure 11:
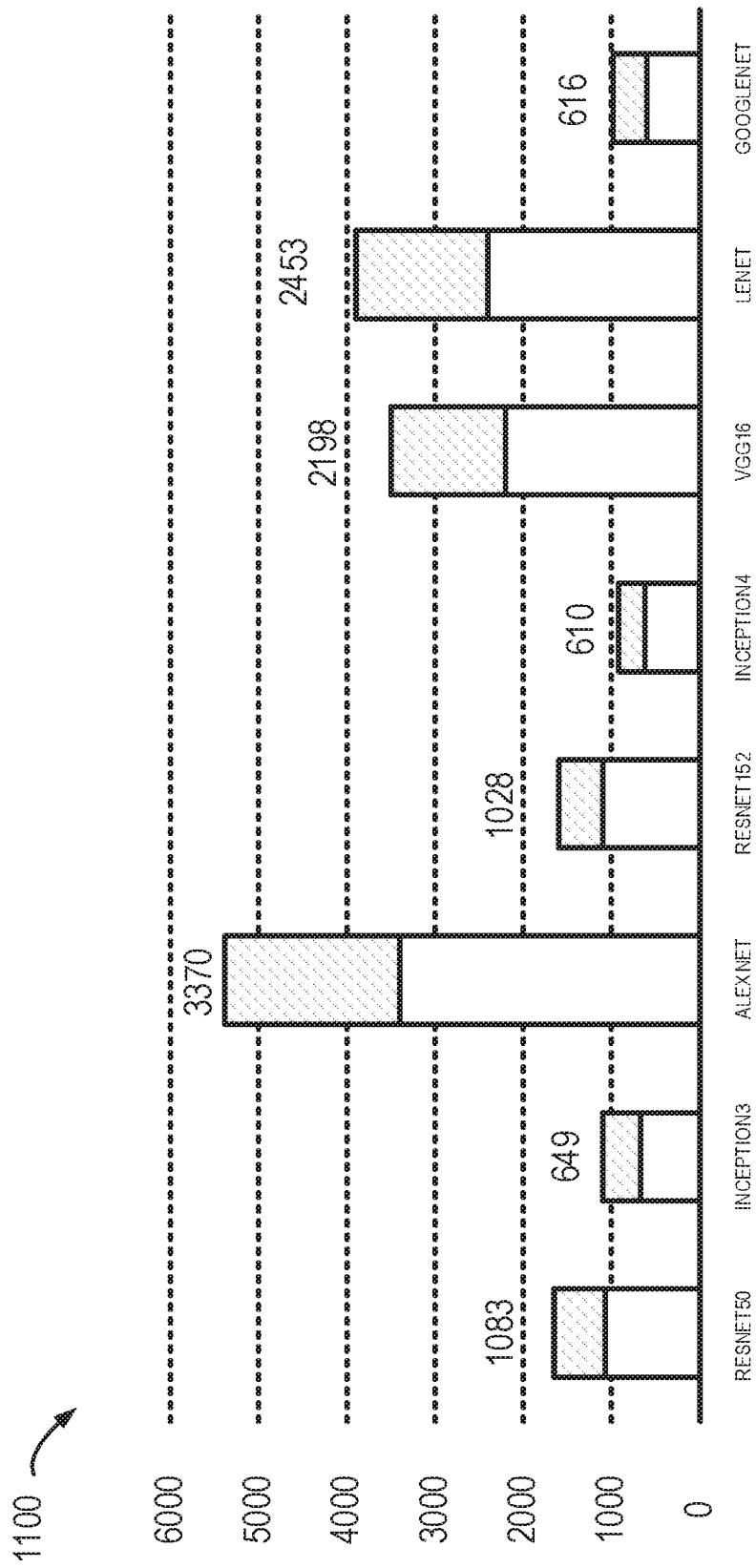
FIG. 11 shows a schematic view of network traffic of the parameter transmission with respect to various deep learning models according to some embodiments of the present disclosure.

FIGS. 10 and 11 compare the traditional parameter transmission and the parameter transmission according to some embodiments of the present disclosure with respect to various deep learning models. FIG. 10 shows a schematic view 1000 of network traffic of the traditional parameter transmission with respect to various deep learning models. As a comparison, FIG. 11 shows a schematic view 1100 of network traffic of the parameter transmission according to some embodiments of the present disclosure with respect to various deep learning models. It can be seen from the comparison between FIGS. 10 and 11 where the shaded portion is reduced network traffic, network traffic of the parameter of the deep learning model according to some embodiments reduces significantly.

Figure 12:
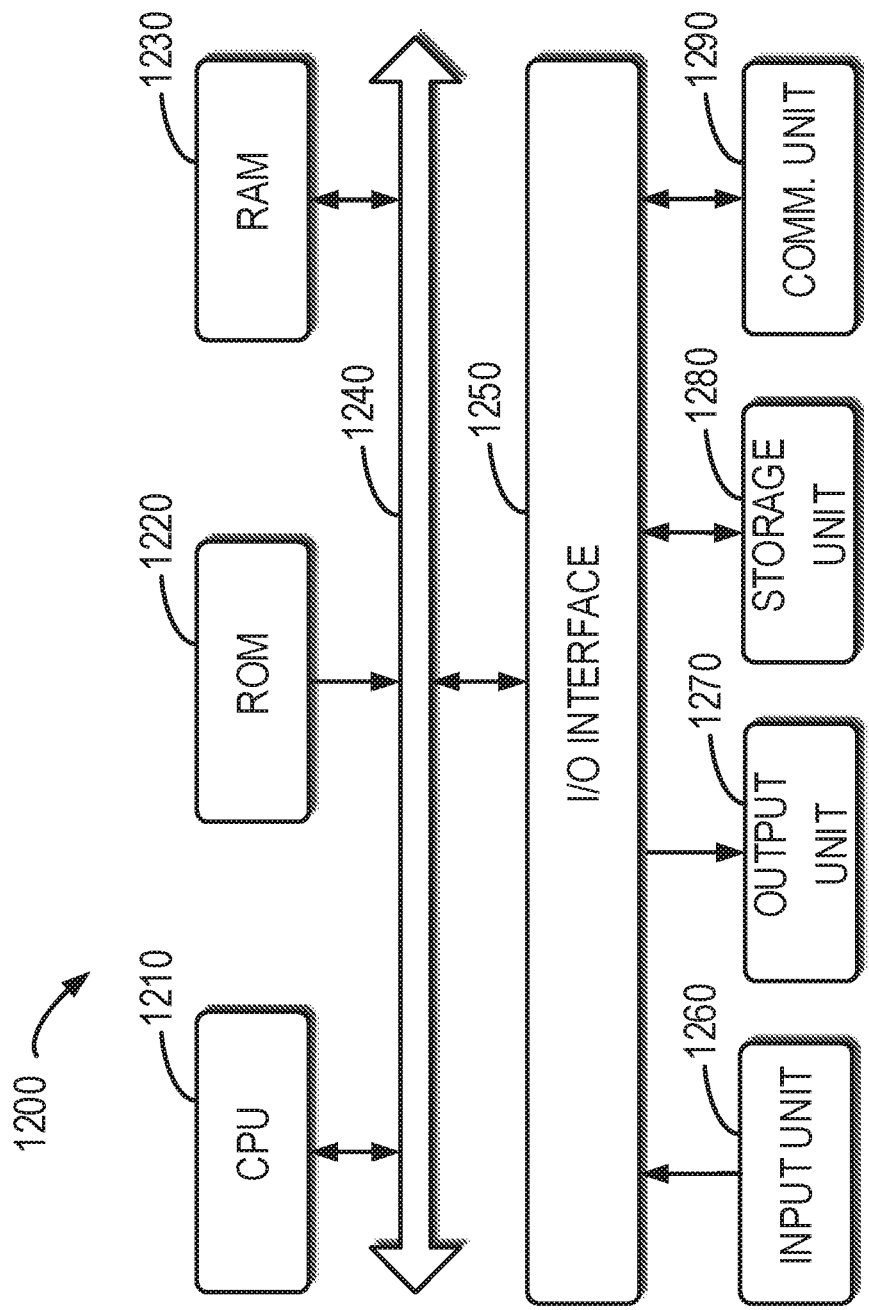
FIG. 12 shows a schematic block diagram of an example device which is applicable to implement embodiments of the present disclosure.

FIG. 12 shows a schematic block diagram of an example device 1200 which is applicable to implement embodiments of the present disclosure. For example, the client 430 or the server 410 or the server 420 as shown in FIG. 4 may be implemented by the device 1200. As depicted, the device 1200 includes a central process unit (CPU) 1210, which can execute various suitable actions and processing based on the computer program instructions stored in the read-only memory (ROM) 1220 or computer program instructions loaded in the random-access memory (RAM) 1230 from a storage unit 1280. The RAM 1230 can also store all kinds of programs and data required by the operations of the device 1200. CPU 1210, ROM 1220 and RAM 1230 are connected to each other via a bus 1240. The input/output (I/O) interface 1250 is also connected to the bus 1240.

A plurality of components in the device 1200 are connected to the I/O interface 1250, including: an input unit 1260, such as keyboard, mouse and the like; an output unit 1270, e.g., various kinds of display and loudspeakers etc.; a storage unit 1280, such as magnetic disk and optical disk etc.; and a communication unit 1290, such as network card, modem, wireless transceiver and the like. The communication unit 1290 allows the device 1200 to exchange information/data with other devices via the computer network, such as Internet, and/or various telecommunication networks.

The above described each procedure and processing, such as the methods 500 and 600, can also be executed by the processing unit 1210. For example, in some embodiments, the methods 500 and 600 can be implemented as a computer software program tangibly included in the machine-readable medium, e.g., the storage unit 1280. In some embodiments, the computer program can be partially or fully loaded and/or mounted to the device 1200 via ROM 1220 and/or the communication unit 1290. When the computer program is loaded to the RAM 1230 and executed by the CPU 1210, one or more steps of the above described methods 500 and 600 can be implemented. Alternatively, in other embodiments, the CPU 1210 also can be configured in other suitable manners to realize the above procedure/method.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some embodiments, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to embodiments of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to embodiments of the present disclosure. In this regard, each block in the flow chart or block diagram can represent a module, a part of program segment or code, wherein the module and the part of program segment or code include one or more executable instructions for performing stipulated logic functions. In some alternative embodiments, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various embodiments of the present disclosure have been described above and the above description is only exemplary rather than exhaustive and is not limited to the embodiments of the present disclosure. Many modifications and alterations, without deviating from the scope and spirit of the explained various embodiments, are contemplated. The selection of terms in the text aims to best explain principles and actual applications of each embodiment and technical improvements made in the market by each embodiment, or enable other ordinary skilled in the art to understand embodiments of the present disclosure.

What is claimed is:

1. A method for deep learning, comprising:
   obtaining, at a client, a parameter related to a deep learning model for a training dataset allocated to a server;
   determining a transmission state of the parameter, the transmission state indicating whether the parameter has been transmitted to the server; and
   determining, based on the transmission state, information associated with the parameter to be sent to the server to update the deep learning model;
   wherein determining the transmission state comprises:
   generating a first digest for identifying the parameter;
   obtaining a predetermined second digest associated with the parameter; and
   comparing the first digest with the predetermined second digest to determine whether the transmission state indicates that the parameter has been transmitted.

2. The method of claim 1, wherein obtaining the parameter comprises:
   obtaining a weight related to the deep learning model for the training dataset, the weight being determined based on a weight change from the server.

3. The method of claim 1, wherein in response to the first digest matching the predetermined second digest, determining that the transmission state indicates the parameter has been transmitted; and
in response to the first digest mismatching the predetermined second digest, determining that the transmission state indicates the parameter has not been transmitted.

4. The method of claim 1, wherein determining the information comprises:
in response to the transmission state indicating the parameter has been transmitted, sending, to the server, an identifier related to the parameter and the transmission state; and
in response to the transmission state indicating the parameter has not been transmitted, sending, to the server, the identifier, the transmission state and the parameter.

5. The method of claim 1, further comprising:
deleting the predetermined second digest at the client; and
storing the first digest at the client.

6. A computer program product, tangibly stored on a non-transient computer readable medium and comprising machine executable instructions which, when executed, cause a machine to implement the method according to claim 1.

7. A device for deep learning, comprising:
at least one processing unit;
at least one memory, coupled to the at least one processing unit and storing instructions executed by the at least one processing unit, the instructions, when executed by the at least one processing unit, causing the device to perform acts comprising:
obtaining, at a client, a parameter related to a deep learning model for a training dataset allocated to a server;
determining a transmission state of the parameter, the transmission state indicating whether the parameter has been transmitted to the server; and
determining, based on the transmission state, information associated with the parameter to be sent to the server to update the deep learning model;
wherein determining the transmission state comprises:
generating a first digest for identifying the parameter;
obtaining a predetermined second digest associated with the parameter; and
comparing the first digest with the predetermined second digest to determine whether the transmission state indicates that the parameter has been transmitted.

8. The device of claim 7, wherein obtaining the parameter comprises:
obtaining a weight related to the deep learning model for the training dataset, the weight being determined based on a weight change from the server.

9. The device of claim 7, wherein in response to the first digest matching the predetermined second digest, determining that the transmission state indicates the parameter has been transmitted; and
in response to the first digest mismatching the predetermined second digest, determining that the transmission state indicates the parameter has not been transmitted.

10. The device of claim 7, wherein determining the information comprises:
in response to the transmission state indicating the parameter has been transmitted, sending, to the server, an identifier related to the parameter and the transmission state; and
in response to the transmission state indicating the parameter has not been transmitted, sending, to the server, the identifier, the transmission state and the parameter.

11. The device of claim 7, the acts further comprising:
deleting the predetermined second digest at the client; and
storing the first digest at the client.

12. A method for deep learning, comprising:
receiving, at a server, information associated with a first parameter and a transmission state of the first parameter from a client, the first parameter being related to a deep learning model for a training dataset allocated to the server, the transmission state indicating whether the first parameter has been transmitted to the server;
determining the first parameter based on the information; and
updating the deep learning model using the first parameter.

13. The method of claim 12, wherein determining the first parameter comprises:
in response to determining that the first parameter has been transmitted based on the information, obtaining an identifier related to the first parameter from the information; and
obtaining, as the first parameter, a second parameter being previously stored and related to the first parameter based on the identifier.

14. The method of claim 12, wherein determining the first parameter comprises:
in response to determining that the first parameter has not been transmitted based on the information, obtaining, from the information, the first parameter and an identifier related to the first parameter.

15. The method of claim 12, further comprising:
deleting a second parameter at the server; and
storing the first parameter at the server.

16. A computer program product, tangibly stored on a non-transient computer readable medium and comprising machine executable instructions which, when executed, cause a machine to implement the method according to claim 12.

17. A device for deep learning, comprising at least one processing unit, at least one memory, coupled to the at least one processing unit and storing instructions executed by the at least one processing unit, the instructions, when executed by the at least one processing unit, causing the device to perform steps of the method according to claim 12.

18. The device of claim 17, wherein determining the first parameter comprises:
in response to determining that the first parameter has been transmitted based on the information, obtaining an identifier related to the first parameter from the information; and
obtaining, as the first parameter, a second parameter being previously stored and related to the first parameter based on the identifier.

19. The device of claim 17, wherein determining the first parameter comprises:
in response to determining that the first parameter has not been transmitted based on the information, obtaining, from the information, the first parameter and an identifier related to the first parameter.

20. The device of claim 17, the steps further comprising:
deleting a second parameter at the server; and
storing the first parameter at the server.

* * * * *